United States Patent
Ryu et al.

(10) Patent No.: US 8,810,747 B2
(45) Date of Patent: Aug. 19, 2014

(54) LIQUID CRYSTAL DISPLAY DEVICE

(75) Inventors: Jae Yong Ryu, Gyeongbuk (KR); Jong Tae Kim, Gyeoungbuk (KR); Sang Ryeon Park, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 266 days.

(21) Appl. No.: 12/961,723

(22) Filed: Dec. 7, 2010

(65) Prior Publication Data

US 2011/0141387 A1 Jun. 16, 2011

(30) Foreign Application Priority Data

Dec. 11, 2009 (KR) ........................ 10-2009-0123589

(51) Int. Cl.
*G02F 1/1333* (2006.01)
*G02F 1/1345* (2006.01)

(52) U.S. Cl.
USPC ............................................ 349/58; 349/150

(58) Field of Classification Search
USPC ...................................................... 349/58, 65
See application file for complete search history.

(56) References Cited

U.S. PATENT DOCUMENTS

| | | | |
|---|---|---|---|
| 2007/0021007 A1 | 1/2007 | Park | |
| 2007/0121023 A1* | 5/2007 | Yang | 349/58 |
| 2007/0211191 A1* | 9/2007 | Cho et al. | 349/58 |
| 2008/0117361 A1 | 5/2008 | Chun et al. | |
| 2010/0066937 A1* | 3/2010 | Yamashita et al. | 349/58 |

FOREIGN PATENT DOCUMENTS

| | | | |
|---|---|---|---|
| CN | 1512223 | A | 7/2004 |
| CN | 1549030 | A | 11/2004 |
| CN | 2737123 | Y | 10/2005 |
| CN | 1260601 | C | 6/2006 |
| JP | 2005-274931 | A | 10/2005 |
| JP | 2005-316337 | A | 11/2005 |
| KR | 10-2006-0122296 | A | 11/2006 |
| KR | 10-2008-0038591 | A | 5/2008 |
| KR | 1020080038591 | A | 5/2008 |
| TW | 200811522 | A | 3/2008 |
| TW | M333582 | U | 6/2008 |

* cited by examiner

*Primary Examiner* — Wen-Ying P Cheng
(74) *Attorney, Agent, or Firm* — McKenna Long & Aldridge LLP

(57) ABSTRACT

An LCD device adapted to simplify a configuration and to secure a ground continuity for driving components is disclosed. The LCD device includes a liquid crystal display panel; a front cover encompassing edges of the liquid crystal display panel; a backlight unit applying light to the liquid crystal display panel and having a front surface supporting the liquid crystal display panel and a rear surface; a back cover receiving the backlight unit; a metal plate fastened and electrically connected to the front cover; and a driver on the metal plate, the driver electrically connected to the metal plate.

19 Claims, 2 Drawing Sheets

LIQUID CRYSTAL DISPLAY DEVICE

CROSS-REFERENCE TO RELATED APPLICATION

This application claims priority under 35 U.S.C. 119 to Korean Patent Application No. 10-2009-0123589, filed on Dec. 11, 2009, which is hereby incorporated by reference in its entirety for all purposes as if fully set forth herein.

BACKGROUND OF THE INVENTION

1. Field of the Disclosure

The present invention relates to a liquid crystal display (LCD) device, and more particularly to an LCD device adapted to simplify a configuration and to secure a ground continuity for driving components.

2. Discussion of the Related Art

Cathode ray tubes (CRTs) have widely been used as one of display devices. The CRTs are mainly used as monitors for TVs, measuring apparatus, information terminals, and others. However, the heavy weight and large size of the CRTs have been a major hindrance to the manufacturing of small and lightweight electronic products. In other words, the CRTs have limitations in weight and size to the current trend of small and lightweight electronic products. Under such circumstances, LCD devices using an electro-optical effect, plasma display panels (PDPs) using a gas discharge, electro luminescence display devices using an electro-luminescent effect, and so on are expected to replace the CRTs.

Among these flat-panel display devices, LCD devices are being actively researched. LCD devices are gradually being used in a wide range of applications due to their advantages such as lightweight, thin profile and low power consumption. Moreover, LCD devices are now being manufactured to have larger screens, be thinner, and consume less power, in order to meet the user demands. Such LCD devices display images by controlling the amount of light transmitted through liquid crystal.

LCD devices are not a self-illuminating display device, unlike CRTs. As such, an LCD device includes a backlight unit provided on the rear surface of an LCD panel. The backlight unit includes a separate light source to display images. The backlight unit can be classified into either an edge type or a direct type, depending on the disposition of a light source.

The edge-type backlight unit is mainly applied to comparatively small-sized LCD devices such as the monitors of laptops and desktop computers. The edge-type backlight unit has a good light uniformity, a long lifespan, and the advantage of thinning the LCD device. The direct-type backlight unit has begun to be developed for LCD devices that have a size above 20 inches. The direct-type backlight unit directly irradiates light onto the entire surface of the LCD panel. To this end, the direct-type backlight unit includes a plurality of light sources arranged on the lower surface of a diffusion plate. Because the direct-type backlight unit has a higher light efficiency than the edge-type backlight unit, it is mainly used for LCD devices of a large size that require a high brightness.

An LCD device includes an LCD module configured to include an LCD panel and a backlight unit, a system driver installed to the rear surface of the LCD module, and upper and lower cases. The LCD panel and the backlight unit are combined with each other by engaging a top case to a bottom cover. The top case is configured to encompass the upper surface edges of the LCD panel. The bottom cover is configured to receive the backlight unit. The upper and lower cases are combined together to enclose the LCD module without covering the display area to complete the assembly of the LCD device.

However, the assembly process of the LCD device is complicated and the efficiency is lower. The assembly process is thus difficult to reduce the production costs and implement LCD devices with a thin profile.

SUMMARY OF THE INVENTION

Accordingly, the present invention is directed to an LCD device that substantially obviates one or more of the problems due to limitations and disadvantages of the related art.

An advantage of the present embodiments is to provide an LCD device that is adapted to simplify a configuration and to secure a ground continuity for driving components.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an LCD device may, for example, include a liquid crystal display panel; a front cover encompassing edges of the liquid crystal display panel; a backlight unit applying light to the liquid crystal display panel and having a front surface supporting the liquid crystal display panel and a rear surface; a back cover receiving the backlight unit; a metal plate fastened and electrically connected to the front cover; and a driver on the metal plate, the driver electrically connected to the metal plate.

In another aspect of the present invention, an LCD device may, for example, include a liquid crystal display panel; a front cover configured to encompass edges of the liquid crystal display panel and to function as a top case and an upper case of the liquid crystal display device; a backlight unit configured to apply light to the liquid crystal display panel and having a front surface supporting the liquid crystal display panel and a rear surface; a back cover receiving the backlight unit and to function as a bottom cover and a lower case of liquid crystal display device; a heat radiation plate disposed under a first side of the backlight unit and configured to discharge heat generated from a plurality of light emission diodes; a support plate disposed under a second side of the backlight unit and configured to support a panel driving printed-circuit-board, wherein the first side is opposite the second side; and a driver disposed on a rear surface of the back light unit and fastened to the support plate and the heat radiation plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
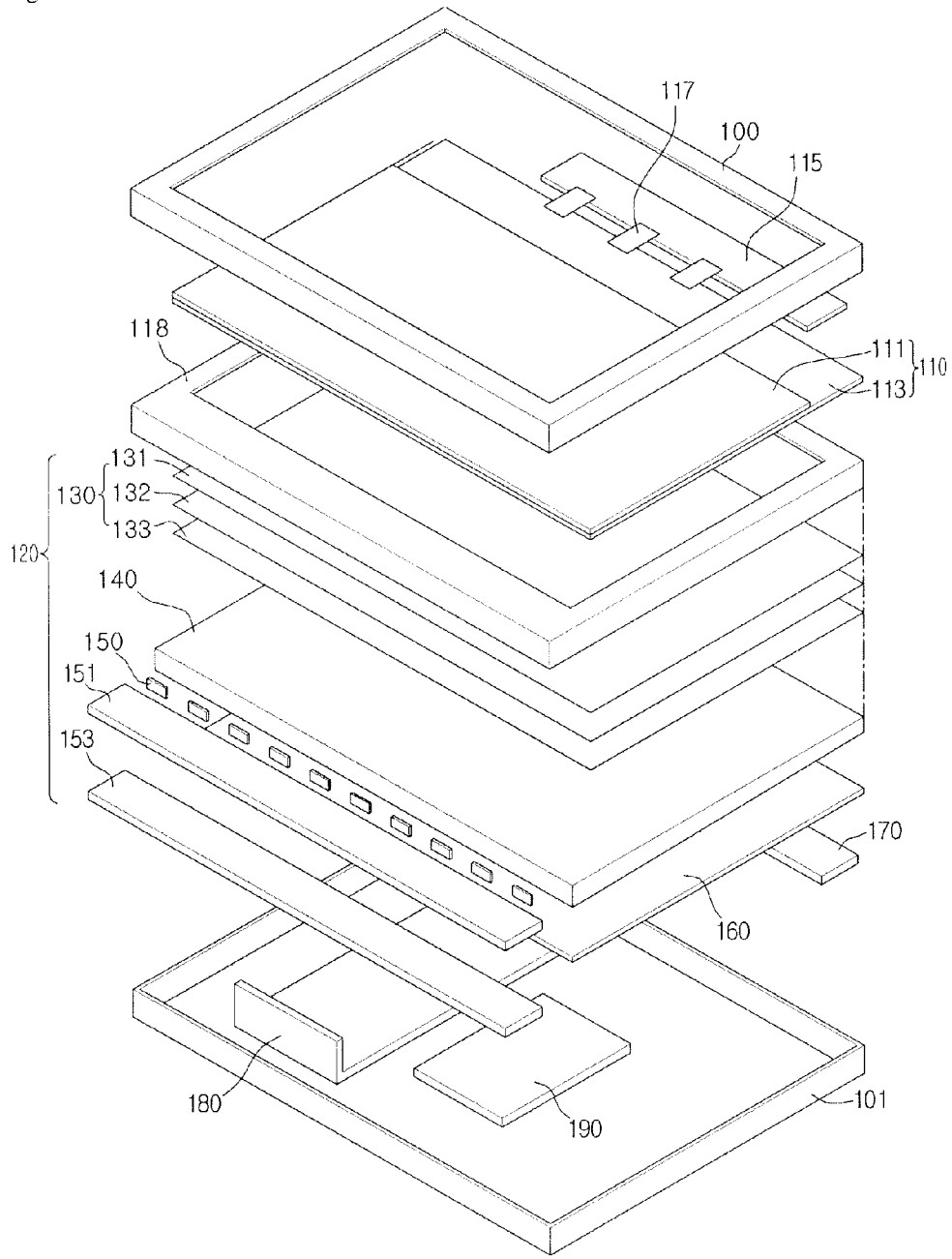
FIG. 1 is a disassembled perspective view illustrating an LCD device according to an embodiment of the present invention.

Reference will now be made in detail to embodiments of the present invention, example of which is illustrated in the accompanying drawings. The size and thickness of the embodiments may be exaggerated for the sake of convenience in the drawings. The same reference numbers may be used throughout the drawings to refer to the same or like parts.

Figure 2:
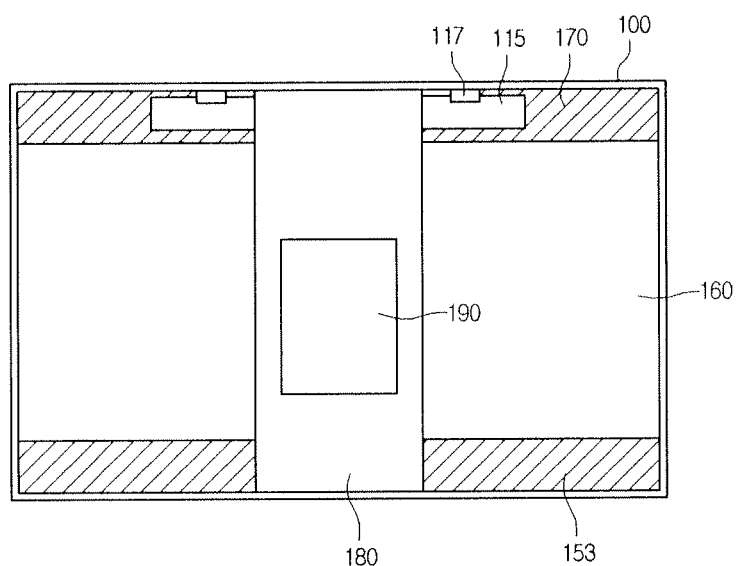
FIG. 2 is a plane view illustrating a rear surface of an LCD device according to an embodiment of the present invention.

FIG. 1 is a disassembled perspective view illustrating an LCD device according to an embodiment of the present invention. FIG. 2 is a plane view illustrating a rear surface of an LCD device according to an embodiment of the present invention.

Referring to FIGS. 1 and 2, the LCD device includes an LCD panel 110 configured to display images, a backlight unit 120 disposed under the LCD panel 110 and configured to provide light, and a front cover 100 configured to encompass upper surface edges and side surfaces of the LCD panel 110. The front cover 100 may be made of a metal material. The backlight unit 120 has a front surface and a rear surface on the opposite side. The LCD panel 110 is supported by the front surface of the backlight unit 120.

The LCD device further includes a metal plate 180 combined with the front cover 100, a driver 190 disposed on the metal plate 180, a back cover 101 holding the backlight unit 120, and a support main 118 formed of a molded material in a rectangular shape. The support main 118 is configured to support lower surface edges of the LCD panel 110 and to receive the backlight unit 120. The front cover 100 functions as a top case and an upper case of the LCD device, and the back cover 101 functions as a bottom cover and a lower case of the LCD device.

The LCD panel 110 includes a color filter substrate 111 and a thin film transistor substrate 113 facing each other and combined with a uniform cell gap between the two substrates. The LCD panel 110 further includes a liquid crystal layer (not shown) between the two substrates.

Although not shown in detail in the drawings, the color filter substrate 111 and the thin film transistor substrate 113 will now be described in detail. The thin film transistor substrate 113 includes a plurality of gate lines and a plurality of data lines formed to cross each other to define a plurality of pixels, and a plurality of thin film transistors near the crossings of the plurality of gate lines and the plurality of data lines. The thin film transistors are respectively connected to pixel electrodes, wherein each pixel includes one pixel electrode. On the other hand, the color filter substrate 111 includes red, green, and blue color filters corresponding to the pixels, a black matrix neighboring the color filters, and a common electrode formed to cover the color filters and the black matrix. The black matrix is formed to shield the gate lines, the data lines and the thin film transistors.

The LCD device still further includes a panel driving PCB (Printed Circuit Board) 115 disposed by an edge of the LCD panel 110. The panel driving PCB 115 applies driving signals to the gate and data lines on the LCD panel 110. To this end, the panel driving PCB 115 is electrically connected to the LCD panel 110 by means of COFs (chip on film) 117. The COFs 117 can be replaced with tape carrier packages (TCPs).

The backlight unit 120 under the LCD panel 110 includes a PCB 151 disposed at an inner side of the front cover 100, a plurality of light emission diodes (LEDs) 150 loaded on the PCB 151 and configured to emit light, a light guide plate 140 disposed parallel with the plurality of LEDs 150 and configured to convert a plurality of spot light into a two-dimensional light. The PCB 151 may be formed of a material having a superior thermal conductivity. For example, the PCB 151 may be formed of a metal material. The backlight unit 120 further includes optical sheets 130 sequentially stacked on the light guide plate 140 and configured to scatter and converge light, a reflection sheet 160 disposed under the light guide plate 140 configured to redirect light travelling downwardly from the light guide plate 140 toward the LCD panel 110.

The optical sheets 130 include a protective sheet 131, a converging sheet 132 and a diffusion sheet 133. The diffusion sheet 133 scatters light from the light guide plate 140. The converging sheet 132 converges the scattered light from the diffusion sheet 133. The protective sheet 131 is used to protect a converging pattern formed on the converging sheet 132.

In addition, the LCD device includes a heat radiation plate 153 disposed on a lower surface of the PCB 151 and configured to rapidly discharge the heat generated from the plurality of LEDs 150. The heat radiation plate 153 comes in surface contact with the PCB 151. Also, the heat radiation plate 153 is fastened and electrically connected to a bottom portion of an inner side surface of the front cover 100. Such a heat radiation plate 153 may be formed to have a bar shape.

The LCD device also includes a support plate 170 fastened and electrically connected to a bottom portion of the other inner side surface of the front cover 100 opposite to the heat radiation plate 153. The support plate 170 may also be formed to have a bar shape. Such a support plate 170 is configured to support the panel driving PCB 115. To this end, the panel driving PCB 115 is fastened and electrically connected to a rear surface of the support plate 170 and connected to the flexible COFs 117.

In the LCD device according to an embodiment of the present invention, the metal plate 180 is disposed under the backlight unit 120. The metal plate 180 extends from a one side surface of the front cover 100 to the other side surface opposite thereto and electrically connected to the front cover 100. In one embodiment, the metal plate 180 straddles the two opposite sides of the rear surface of the backlight unit 120, and is fastened to the front cover 100 and configured to extend from a one side to the other side of the front cover 100. Also, the metal plate 180 is combined with both side surfaces of the front cover 100. A longitudinal axis of the metal plate 180 forms an angle with a longitudinal axis of the heat dissipation plate 153 and another angle with a longitudinal axis of the support plate 170. As such, the metal plate 180 partially overlaps both the heat radiation plate 153 and the support plate 170.

The driver 190, which is electrically connected to and disposed on the metal plate 180, is not shown in detail in the drawings. However, the driver 190 is configured to include a panel driving portion, a backlight driving portion and a system driving portion that are united with one another. The panel driving portion is used to drive the LCD panel 110, while the backlight driving portion is used to drive the plurality of LEDs 150.

As described above, the LCD device according to an embodiment of the present invention allows the front cover 100 to be combined with the metal plate 180. In addition, the back cover 101 allows the driver 190 including the panel, backlight, and system driving portions to be disposed on the metal plate 180. As such, the LCD device according to an embodiment of the present invention can be assembled in a simpler manner than the related art LCD devices, and it can also become slimmer (or thinner).

Moreover, when the front cover 100 is made of metal and the LCD device of the present embodiment connects the front cover 100 to the metal plate 180, the LCD device can secure a ground continuity for the panel driving PCB 115 and the driver 190.

Figure 3:
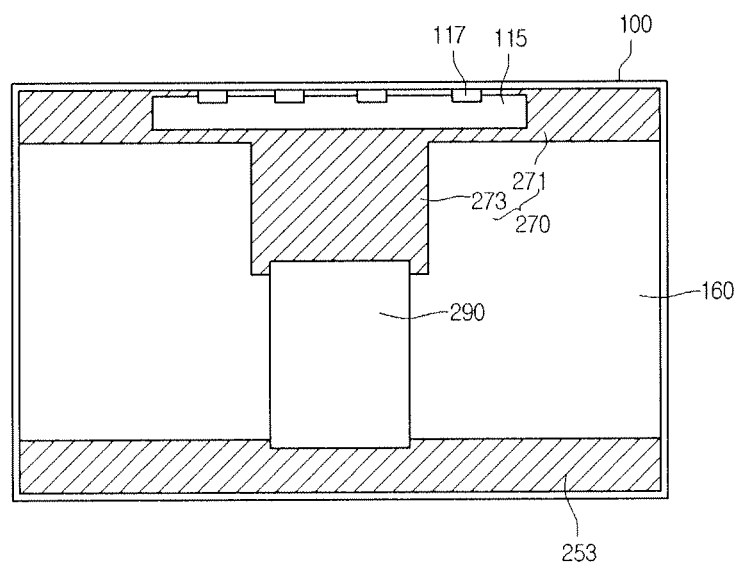
FIG. 3 is a plane view illustrating a rear surface of an LCD device according to another embodiment of the present invention.

FIG. 3 is a plane view illustrating a rear surface of an LCD device according to another embodiment of the present invention.

Referring to FIG. 3, the LCD device is configured in the same manner as that of the first embodiment, except for a support plate 270 that is configured to support the panel driving PCB 115 as well as a driver 290. The components of this embodiment that have the same configurations as those of the first embodiment will be referred to by the same reference numbers and names. Also, the descriptions of these components will be omitted.

In the LCD device according to another embodiment of the present invention, the support plate 270, which is fastened to an inner side surface of the front cover 100 and electrically connected to the front cover 100, includes a first support portion 271 loaded with and connected to the panel driving PCB 115 and a second support portion 273 configured to extend outwardly from an edge of the first support portion 271. The second support portion 273 comes in surface contact with an edge of the driver 290. Such a second support portion 273 is used to provide the support plate 270 with a space for the combination with the driver 290.

The driver 290 is disposed to connect the second support portion 273 and a heat radiation plate 253. To this end, an end of the driver 290 is fastened to the second support portion 273, and the other end of the driver 290 is fastened to the heat radiation plate 253. The heat radiation plate 253 is fastened to an inner side surface of the front cover 100 and electrically connected to the front cover 100. The PCB 151 is supported and electrically connected to the heat radiation plate 253. In one embodiment, the driver 290 is further electrically connected to at least one of the heat radiation plate 253 and the second portion 273.

Similar to the first embodiment, the back cover 101 allows the driver 290 to be fastened to the support plate 270, which is disposed on a bottom portion of a one side surface of the front cover 100, and the heat radiation plate 253, which is disposed on a bottom portion of the other side surface of the front cover 100. As such, the LCD device can be assembled in a simpler manner than the related art LCD devices, and it can also become slimmer (or thinner). Moreover, because the LCD device does not require the top case and bottom cover of the related art LCD devices, the overall thickness can be further reduced.

Furthermore, the LCD device allows the driver 290 to be fastened to the support and heat radiation plates 270 and 253 that are formed of a metal material. This enables the support and heat radiation plates 270 and 253 to be electrically connected to the front cover 100. Therefore, the LCD device can secure a ground continuity for the panel driving PCB 115 and the driver 190.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
a liquid crystal display panel;
a front cover encompassing edges of the liquid crystal display panel;
a backlight unit applying light to the liquid crystal display panel and having a front surface supporting the liquid crystal display panel and a rear surface;
a back cover receiving the backlight unit;
a metal plate fastened and electrically connected to the front cover;
a driver on and in contact with the metal plate, the driver electrically connected to the metal plate;
a heat radiation plate fastened and electrically connected to an inner surface of the front cover;
a support plate fastened and electrically connected to the inner surface of the front cover opposite to the heat radiation plate; and
a panel driving printed-circuit-board at an edge of the liquid crystal display panel, wherein the panel driving printed-circuit-board is disposed on a rear surface of the support plate,
wherein the panel driving printed-circuit-board is disposed between the support plate and the metal plate.

2. The liquid crystal display device claimed as claim 1, wherein the front cover functions as a top case and an upper case of the liquid crystal display device, and wherein the back cover functions as a bottom cover and a lower case of the liquid crystal display device.

3. The liquid crystal display device claimed as claim 1, wherein the metal plate is fastened to at least two opposite sides of the front cover.

4. The liquid crystal display device claimed as claim 1, wherein the metal plate straddles at least two opposite sides of a rear surface of the backlight unit.

5. The liquid crystal display device claimed as claim 1, wherein the backlight unit includes a printed-circuit-board loaded with a plurality of light emission diodes.

6. The liquid crystal display device claimed as claim 5, wherein the driver includes a backlight driving circuit that drives the plurality of light emission diodes, along with a panel driving circuit and a system driving circuit.

7. The liquid crystal display device claimed as claim 6, wherein the heat radiation plate is configured to come in a surface contact with the printed-circuit-board.

8. The liquid crystal display device claimed as claim 1, wherein the heat radiation plate is configured to support and electrically connected to the panel driving printed-circuit-board.

9. A liquid crystal display device comprising:
a liquid crystal display panel;
a front cover configured to encompass edges of the liquid crystal display panel and to function as a top case and an upper case of the liquid crystal display device;
a backlight unit configured to apply light to the liquid crystal display panel and having a front surface supporting the liquid crystal display panel and a rear surface;
a back cover receiving the backlight unit and to function as a bottom cover and a lower case of liquid crystal display device;
a heat radiation plate disposed under a first side of the backlight unit and configured to discharge heat generated from a plurality of light emission diodes;
a support plate disposed under a second side of the backlight unit and configured to support a panel driving printed-circuit-board, wherein the first side is opposite the second side; and
a driver disposed on a rear surface of the back light unit and fastened to the support plate and the heat radiation plate.

10. The liquid crystal display device claimed as claim 9, wherein the front cover is made of metal material, the heat radiation plate is fastened to an inner side of the front cover and electrically connected to the front cover.

11. The liquid crystal display device claimed as claim 9, wherein the backlight unit includes a printed-circuit-board loaded with the plurality of light emission diodes.

12. The liquid crystal display device claimed as claim 11, wherein the printed-circuit-board loaded with the light emission diode is supported and electrically connected to the heat radiation plate.

13. The liquid crystal display device claimed as claim 9, wherein the front cover is made of metal material, the support plate is fastened to an inner surface of the front cover and electrically connected to the front cover and the support plate is supported and electrically connected to the panel driving printed-circuit-board.

14. The liquid crystal display device claimed as claim 9, wherein the front cover is made of metal material, the support plate and the heat radiation plate are fastened to inner sides of the front cover and electrically connected to the front cover and the driver is electrically connected to at least one of the support plate and the heat radiation plate.

15. The liquid crystal display device claimed as claim 9, wherein the support plate includes; a first support portion supporting the panel driving printed-circuit-board; and a second support portion extending from the first support portion and fastened to the driver.

16. The liquid crystal display device claimed as claim 15, wherein the driver is fastened to the heat radiation plate.

17. The liquid crystal display device claimed as claim 9, wherein the support plate and the heat radiation plate are fastened to side surfaces of the front cover.

18. The liquid crystal display device claimed as claim 9, wherein the heat radiation plate and the support plate are formed of a metal material.

19. The liquid crystal display device claimed as claim 9, wherein the driver includes a backlight driving circuit that drives the plurality of light emission diodes.

* * * * *